C. J. ENGLERT.
ENGINE CRANK.
APPLICATION FILED FEB. 7, 1912.
1,100,361.
Patented June 16, 1914.
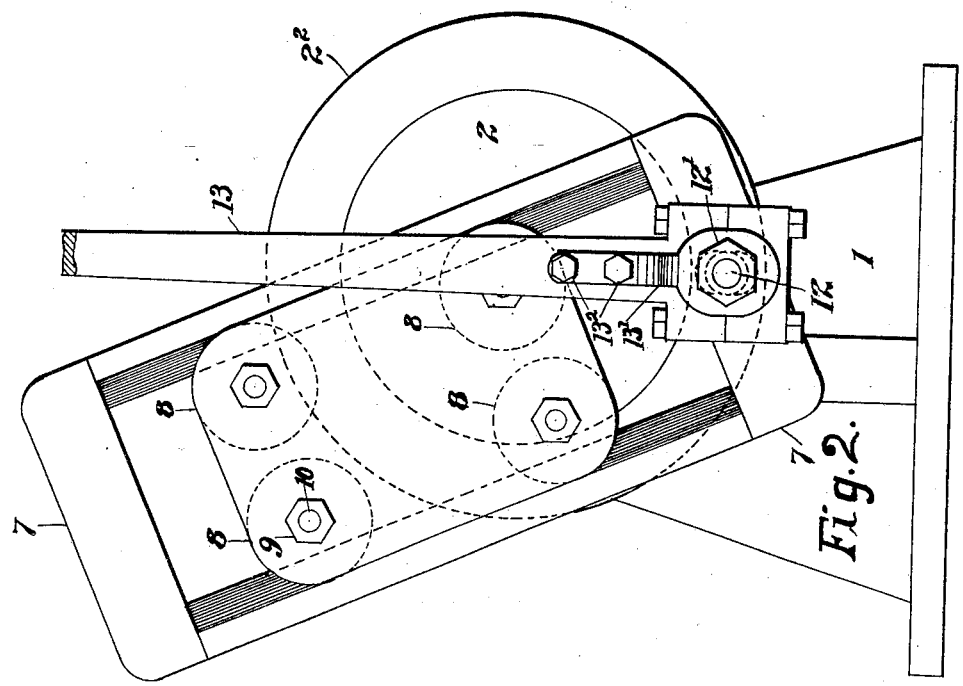
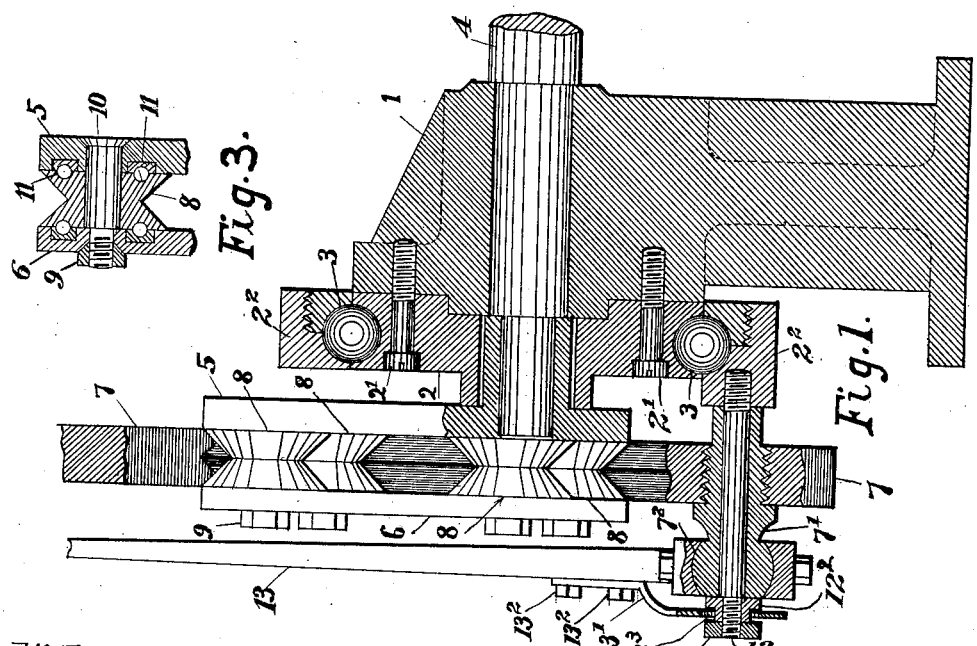
Witnesses:
Harold Everett Nesbitt.
Anna B. Lindsay.
Inventor
Conrad J. Englert,
by his Attorneys,
Mitchell, Chadwick & Kent

UNITED STATES PATENT OFFICE.

CONRAD J. ENGLERT, OF SCHENECTADY, NEW YORK.

ENGINE-CRANK.

1,100,361.            Specification of Letters Patent.      Patented June 16, 1914.

Application filed February 7, 1912. Serial No. 675,949.

*To all whom it may concern:*

Be it known that I, CONRAD J. ENGLERT, a citizen of the United States, residing at Schenectady, in the county of Schenectady and State of New York, have invented new and useful Improvements in Engine-Cranks, of which the following is a specification.

This invention relates to improvements in engine cranks.

More particularly it relates to improvements in the type of mechanism shown in my Letters Patent No. 776,228 of November 29, 1904.

The improvements herein set forth relate especially to the mounting of the eccentric bearing and the connections of the extension frame to the crank pin and to the shaft.

The objects of the invention are accomplished by the mechanism shown in the accompanying drawings, in which—

Figure 1 is a side elevation, with the main shaft shown in section on the vertical plane through the center of the shaft and with the other parts partly in section; Fig. 2 is an end elevation; and Fig. 3 is a detail in section.

Referring to the drawings the pedestal 1 carries a round plate 2 fixed firmly on the pedestal by bolts $2^1$, in an eccentric position with respect to the main shaft. In this respect it is unlike the construction shown in my said former patent, in which the eccentric is mounted movably. This eccentric plate is surrounded by a ring of balls 3 which form a bearing for a movable rotating member $2^2$, carrying, by a pin 12, the crank pin $7^1$. The pin 12 constitutes a core or axis for the crank pin. The main shaft of the engine, marked 4, is attached to one member 5, of a composite block on which is mounted a frame 7. The latter is capable of sliding to and fro on the block, traveling on sheaves 8 at the four corners of the block. The interior of the longitudinal bars of the frame 7 present a V-shaped surface to the sheaves; the sheaves are formed with V-shaped faces conforming to the interior faces of said longitudinal bars of the frame; and these bars are spaced apart at suitable distances to receive the sheaves between them and to slide to and fro upon them with a good running fit. In one end of the frame 7 the crank pin $7^1$ is fixed. This has a spherical bearing knob $7^2$ on which the connecting rod 13 fits. The latter has an auxiliary member $13^1$ fixed firmly upon it by bolts $13^2$ and projecting beside the connecting rod in the direction of its length to a place where a slot or oval shaped hole marked $13^3$ is provided. The width of this slot is such as to receive with a smooth fit the neck of a washer $12^2$, which washer is held by a nut $12^1$ on the end of the pin 12 which forms the core or support for the crank pin $7^1$. The spherical face of the bearing $7^2$ prevents any frictional binding between the connecting rod and the crank pin, in case the latter bends or gives a little when the power is applied to it; and the auxiliary member $13^1$ with its slot $13^3$ closely fitting the collar 2 prevents any twisting of the connecting rod upon the spherical bearing. The nut 12 helps hold the collar and the member $13^1$ in place on the pin. In this respect it coöperates with the shape of bearing $7^2$ whose curved contour, as clearly seen in Fig. 1, prevents the connecting rod from slipping to the right or to the left on the crank pin. The crank pin is fixed steady in the frame 7 by the screw threads seen in figure. Both frame and pin are attached rigidly to the ring $2^2$ which rotates upon the eccentric ring of balls 3.

The construction of the sheaves 8 is shown in detail in Fig. 3, where, as also shown in Fig. 1, it is seen that the composite block has approximately rectangular side members 5 and 6 between which at the corners are located the V-shaped sheaves 8. These side members are held together by nuts 9 on bolts 10, the sheaves intervening between them set between ball bearings 11. A ring of these balls is set at each side of each sheave as seen in Fig. 3, with the balls projecting into the sheave, so that the sheave is always supported by the rolling balls, whether the pressure on the sheave be toward the axis thereof or be laterally in either direction parallel to the axis thereof. The block, consisting as a whole, of the members 5 and 6 and the sheaves 8, constitutes one member of a composite crank arm operating on the principles set forth in my said Letters Patent, the other member of such composite crank arm being the frame 7 which moves to and fro, sliding as it were, although without the disadvantages of sliding friction, and furnishing a changing leverage which automatically favors the action of the piston.

The fastening of the plate 2 to the pedestal 1 gives a rigid support for the ring of balls 3 upon which the eccentric ring 2² turns. This absolutely prevents the eccentric from tilting under the stresses imposed by the thrust of the piston, which it will be observed is applied at the bearing 7² at some distance from the plane of the bearing or support. At the same time this permits an abundant clearance to be provided between the inside of the plate 2 and the outside of the hub or socket of member 5 where it fits upon the shaft 4, instead of the running fit shown in my said patent, which involves a certain degree of looseness. The new construction prevents frictional binding at this point and also avoids the necessity of providing lubrication there, and consequently adds to the efficiency of the engine and simplifies its construction and operation. The advantages of this rigidity of construction are made further available by the improvement of connections between the connecting rod 13 and the eccentric bearing ring 2², while the certainty of transmission of power from these parts and the crank pin to the composite block and to the shaft 4 is by the use of V-shaped sheaves, as illustrated, arranged in ball bearings. The engine and the crank, as a whole, operate substantially on the principle of the mechanism explained in my said Patent, No. 776,228, to which reference is made for further details. Of course, variations may be made from the precise construction and arrangement shown without departing from the scope of the invention.

I claim as my invention:—

1. In combination, a pedestal having a bearing for a shaft combined with an element arranged to rotate about it eccentrically, and a composite crank having one member attached to the shaft and another member provided with a crank pin and adapted to travel to and fro on the first member, arranged in operative connection with the said rotatable element, whereby the leverage of the crank is varied during the stroke; the bearing between the members of the composite crank being V-faced sheaves and bars fitting the V-faces.

2. In combination, a pedestal having a bearing for a shaft combined with an element arranged to rotate about it eccentrically, and a composite crank having one member attached to the shaft and another member provided with a crank pin and adapted to travel to and fro on the first member, arranged in operative connection with the said rotatable element, whereby the leverage of the crank is varied during the stroke; the bearing between the members of the composite crank being V-faced sheaves and bars fitting the V-faces; said sheaves being supported laterally on rings of balls at each side, there being at each ring of balls a grooved piece set in the block, forming a runaway for the balls, the balls projecting into a coöperating groove in the side of the sheave.

3. In combination, a pedestal having a bearing for a shaft combined with an element arranged to rotate about it eccentrically, and a composite crank having one member attached to the shaft and another member provided with a crank pin and adapted to travel to and fro on the first member, arranged in operative connection with the said rotatable element, whereby the leverage of the crank is varied during the stroke; the crank pin having a spherical-surface bearing; a connecting rod adapted to be connected to a reciprocating piston; and a member on the connecting rod forked across another portion of the crank pin, thereby preventing the connecting rod from twisting on the sperical bearing.

4. In combination, a pedestal having a bearing for a shaft combined with a plate rigidly fixed on the pedestal and having a bearing eccentric to the shaft bearing; an element arranged to rotate on said eccentric bearing; a composite crank having one member attached to the shaft and another member adapted to travel to and fro on the first member in operative connection with said eccentric rotatable element, whereby the leverage of the crank is varied, and provided with a spherical surface crank pin, there being V-faced sheaves forming the bearing between the parts of the composite crank; a connecting rod adapted to be connected to a reciprocating piston; and means to prevent said connecting rod from twisting on the spherical bearing.

Signed by me at Schenectady, N. Y., this 3rd day of Feb. 1912.

CONRAD J. ENGLERT.

Witnesses:
 CHARLES BANK,
 ANTHONY J. ENGLERT.

---

Copies of this patent may be obtained for five cents each, by addressing the "Commissioner of Patents, Washington, D. C."